Nov. 6, 1945.  T. J. STEPHENS  2,388,298
METHOD OF ROASTING VEGETABLE MATERIAL
Filed Aug. 13, 1942   2 Sheets-Sheet 1
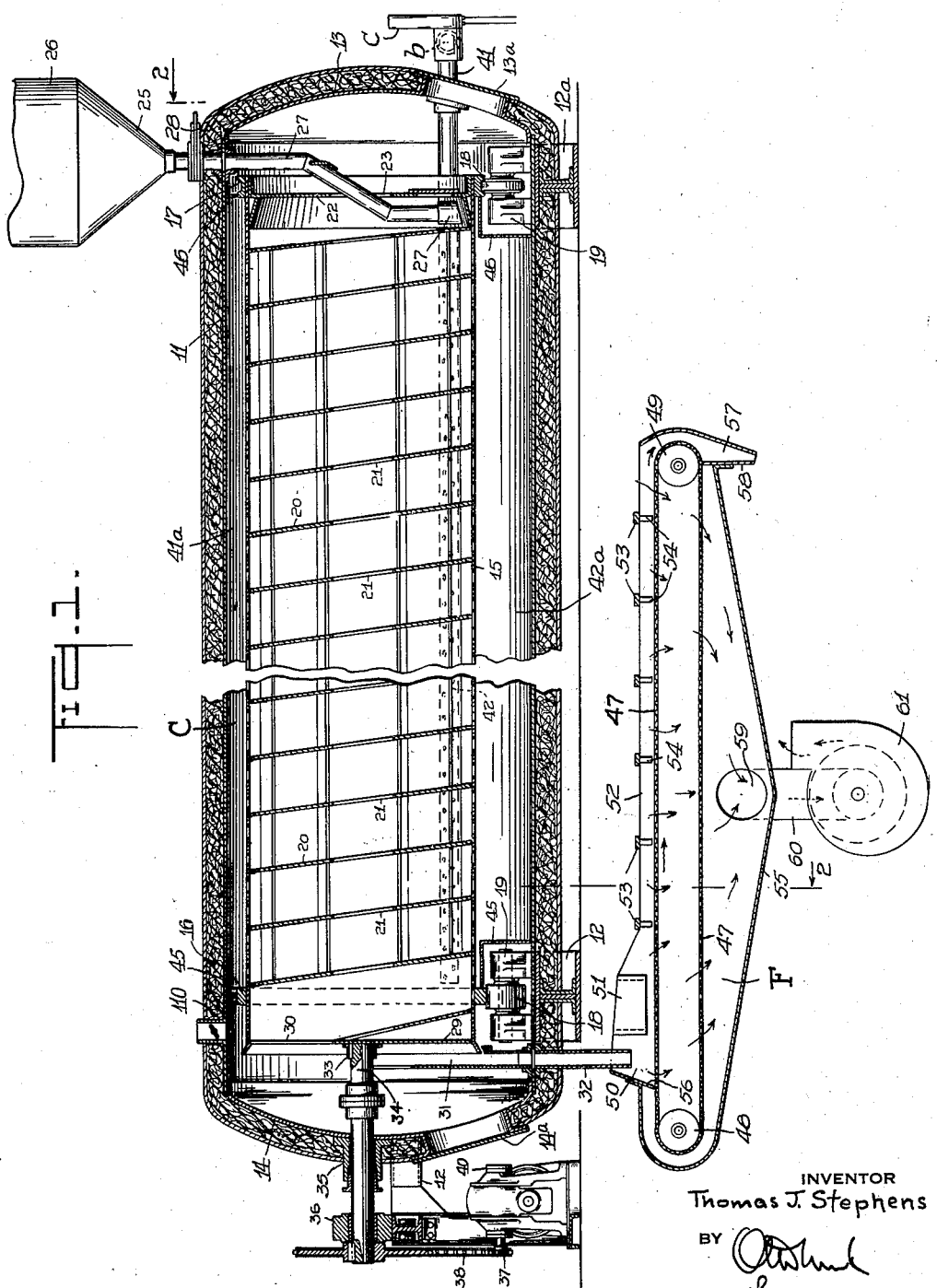
INVENTOR
Thomas J. Stephens
BY
his ATTORNEY Nov. 6, 1945.  T. J. STEPHENS  2,388,298
METHOD OF ROASTING VEGETABLE MATERIAL
Filed Aug. 13, 1942  2 Sheets-Sheet 2
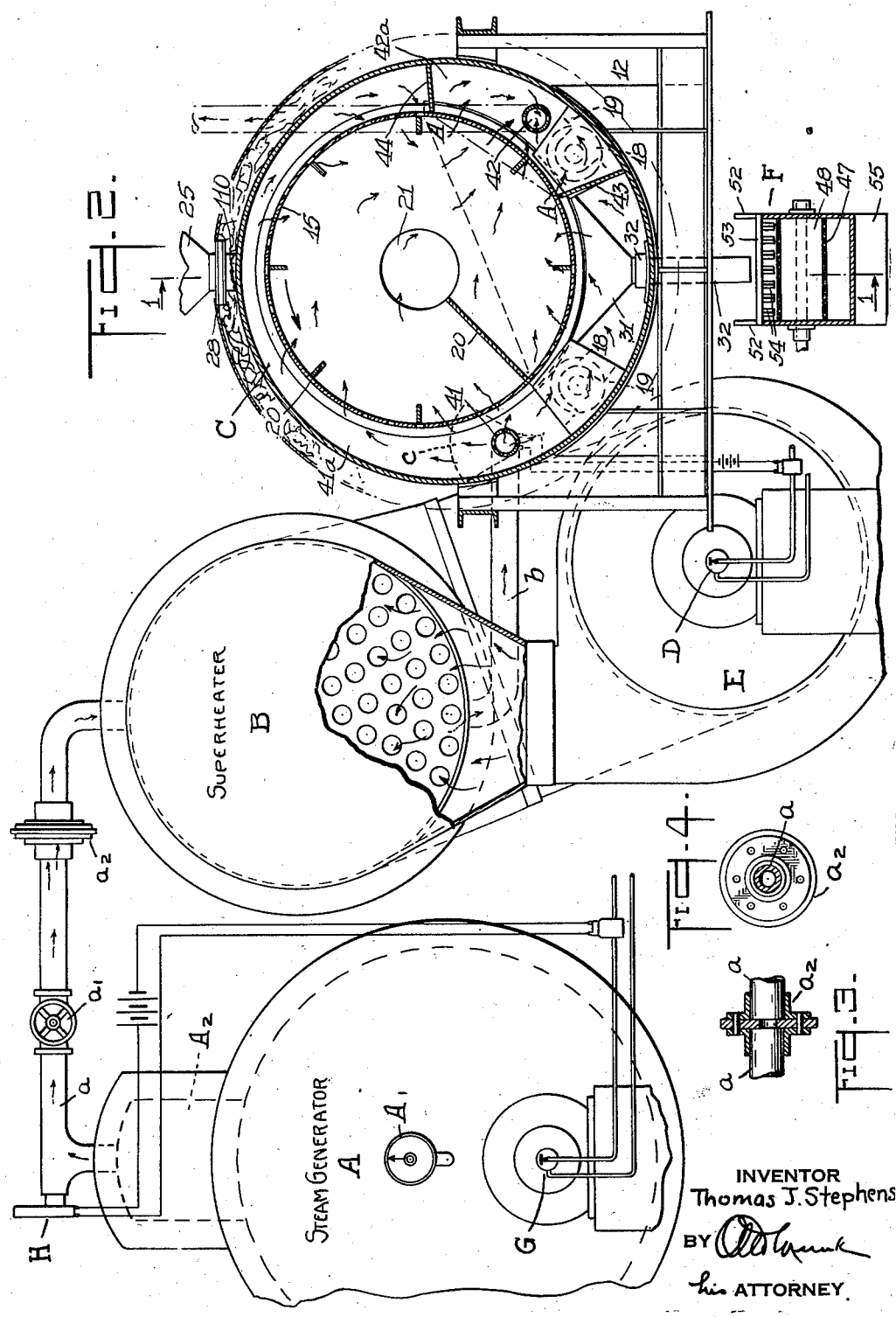

Patented Nov. 6, 1945

2,388,298

UNITED STATES PATENT OFFICE 2,388,298

METHOD OF ROASTING VEGETABLE MATERIAL

Thomas J. Stephens, New York, N. Y., assignor to Frederick W. Ludwig, as trustee for the benefit of Thomas J. Stephens, Henry A. Rudkin, and Frederick W. Ludwig Application August 13, 1942, Serial No. 454,694

9 Claims. (Cl. 99—68)

This invention relates to the art of roasting certain materials, such for example as coffee, nuts, beans, grains and the like, preparatory to the manufacture thereof into beverages and food products.

The present application is a continuation-in-part of my co-pending application Serial No. 410,984, filed Sept. 16, 1941.

Inasmuch as the precisely correct heat treatment of coffee is, perhaps, more difficult to perform than that of any other of the food materials, I have elected to describe the present method and apparatus specifically with reference to the roasting of coffee, desiring it to be understood that the description is given by way of example only and that my method and apparatus may be varied, or modified, within the scope of the invention, to meet the requirements for roasting other materials having characteristics differing from those of coffee.

It is very interesting to note that there has always existed, and still persistently exists a widespread belief that the use of coffee as a beverage is not conducive to good health. It is well known to dietitians, chemists and physicians, that unsaturated, unbalanced chemical compounds, when taken into the alimentary tract, have the tendency to complete or satuate themselves by taking from the glandular secretions, the tissues and even the blood, that element which they require to complete their saturation.

When the chemical reactions proceeding in coffee, during the roasting process, are suddenly terminated before maturity by quenching or otherwise, it is almost conclusive that unsaturated and avid compounds will reside in the coffee. The presence of such compounds in improperly roasted coffee, together with their avidity to saturate themselves in the presence of foreign substance, such for example as air, may be a large factor in the rapid deterioration of flavor and aroma in such coffee after roasting. This condition may also have contributed very extensively to the belief that coffee drinking is an unhealthful habit.

My experimental work strongly indicates that deterioration of the compounds after roasting by my method proceeds much more slowly than in coffee roasted by inaccurate and loosely controlled methods. It also strongly indicates that the product of my method contains a more abundant quantity of essential compounds; and that their quality is of a higher order of maturity, and yields a more full flavored and aromatic beverage than the same coffee roasted by conventional methods.

An object of the present invention is to provide a method and means whereby a more abundant quantity, as well as a more perfect quality of essential compounds can be developed in roasting coffee, and can be retained by the coffee for a longer period after roasting. Another object is to develop greater expansion of the coffee bean and consequently greater porosity in the cell structure of the roasted coffee, to facilitate more complete leaching out of the essential compounds by hot water in the subsequent brewing of beverage therefrom.

By my roasting process, coffee can be expanded, volumetrically, to a degree 20 percent greater than by other processes in commercial use. The expansion, however, can be controlled. Inasmuch as the process also produces a corresponding increase in the quantity of essential compounds, a given volume of coffee, so roasted, will produce as many cups of equivalent beverage as the same volume of similar coffee roasted by present commercial methods, notwithstanding the last mentioned volume contains more weight. This is because of two facts, (a) a greater abundance of essential compounds are developed and retained in the coffee by my process; and (b) greater porosity is also developed, which results in the essential compounds being more completely leached from the ground coffee by hot water in brewing the beverage. From these facts it follows that by adjusting my roaster to a relative volumetric increase of 12½%, the commercial packer can fill a container with 14 ounces of the expanded and enriched coffee, whereas 16 ounces is now required. Therefore, the cost of 2 ounces of finished product per package is saved by the packer, while at the same time the consumer receives an equivalent value, or, as an alternative, a larger container holding 16 ounces can be sold at approximately the same price, thereby giving the consumer a visibly and intrinsically greater value. This value can be extended as high as 20%.

Coffee, in its green or raw state is without value for food or beverage purposes. When, however, its temperature is raised to about 320° F. a variety of chemical reactions begin to take place among the constituents of each coffee bean, resulting in the formation of soluble compounds which yield the flavor and aroma of roasted coffee.

These reactions, which occur throughout the cell structure of the coffee bean, are dependent upon temperature for their initiation; and varying degrees of temperature initiate various chemical reactions producing correspondingly varying characteristics in the resultant beverage. This is because the numerous chemical combinations within the coffee bean do not occur at the same degree of temperature; that is to say, some reactions are induced by a degree of temperature which is not sufficiently high to induce others necessary to the formation of additional compounds which are required in the finished product. These occur subsequently at a higher temperature degree. Accordingly, the beverage produced from roasted coffee becomes characteristic of the highest degree of temperature to which the beans have been raised during the roasting process, the quality of the resultant beverage being merely a cross sectional average blend of all of the essential compounds, which have been created in the coffee by temperature induced chemistry, during its roasting, and which have been retained or partially retained within the beans up to the time of brewing the beverage.

Inasmuch as the flavor and aroma of the beverage is contributed to and determined by the presence of many different essential compounds, each of which is formed in the coffee bean at a different point of temperature, while the bean is rising up the temperature scale to the highest desirable point, and, inasmuch as the first essential compounds formed at low temperature are likely to be wasted through volatilization at higher temperature, it becomes expedient to raise the bean to the maximum temperature necessary for development of the last forming compounds before the first formed compounds have wasted. Accordingly, the element of time becomes an important consideration of the roasting operation, not only as to raising the bean through the necessary temperature scale to produce its essential compounds, but also as to withdrawal of heat from the beans immediately after all desirable compounds have been completed, in order to prevent their wastage through volatilization.

Furthermore, account must be taken of the fact that the chemical reactions which produce essential compounds in roasting coffee are highly exothermic in character; and that the heat yielded by uniting atoms is imprisoned where it is produced—in the structure of the bean. Accordingly, the roasting bean which is receiving heat from without, and at the same time having heat generated within itself, will rise in temperature with increasing rapidity to the full point of development and quickly pass over into a stage of wastage, if the point of full development is not recognized and provision made for withdrawing heat from it at this exact point. Certainly, beverage of a kind can be made from coffee in which development of essential compounds have been terminated before reaching the ultimate point of maturity, and also from coffee which has passed through a degree of wastage beyond that point, but the ultimate desideratum can be attained only by positive and rapid withdrawal of heat at the definite temperature point which marks the completion of the development of all of the desirable compounds.

In this connection distinction must be recognized between temperature and quantity in dealing with heat. Temperature represents intensity—the scorching, burning, destructive property of heat—but has no relation to quantity. There is a definite best temperature for the medium with which to heat-treat coffee for development of its flavor and aroma. My experiments place this at about 750° F.

The granular nature of coffee renders it highly adaptable to uniform heat treatment by intercommingling of its granules within a stream of heat laden gas. Some gases when used as a vehicle from which to transfer heat into organic materials, have a harsh, drying, deteriorating effect upon the product. This is true of products of combustion or of these mixed with air. Steam, on the contrary, possesses a gentle, enlivening effect when brought in contact with such product. In recognition of this fact, practically all commercial bake ovens used for the production of bread and cake of every description, are provided with means for filling their baking chambers with steam, which envelopes the baking product.

Accordingly, I have adopted steam as a vehicular medium for infusing heat into coffee to accomplish its roasting, because its properties appear to be best adapted to the requirements of the operation, as well as to the delicate nature of the product, although the use of any other gas, inert to the product, falls within the scope of my invention.

Basically, the new process consists in continuously moving a mass of material to be roasted, as for instance coffee beans, in a manner to continuously intercommingle the constituents of the mass, and simultaneously passing a measured quantity of superheated steam, or any other adaptable gas, through the intercommingling mass during a predetermined time interval.

For example, a mass of raw coffee beans, the initial temperature of which is that of normal room temperature, is caused to continuously move within a chamber through which superheated steam is passed, the flow of the steam being directed through the moving mass of coffee. If the pressure within the steam chamber is the same as that of the atmosphere, steam will condense on each coffee bean until the temperature of the bean has been caused, by deposit of kinetic energy of superheat, plus the deposit of latent heat of condensation, to rapidly rise to 212° F., and after the bean has reached 212° F., no further water of condensation will be deposited on the beans. However, the temperature of the beans will continue to rise through absorption of the kinetic energy of the superheat in the steam. The rapidity of such rise about 212° F. will depend upon two independent factors, each of which is controllable and predeterminable. These factors are (a) the degree of superheat in the steam above its dew point, and (b) the relation between the quantity of steam and the quantity of coffee through which the steam passes. The relative adjustment of these conditions will determine the time required to raise the mass of coffee, uniformly, to any desired temperature within the range of the operation.

I have discovered that with the correlative adjustment of the quantity of coffee (of uniform initial temperature), the quantity of steam passed therethrough, and the degree of superheat in the steam, it is possible to predetermine the exact time interval which is required to roast raw coffee to any desired degree. My new roasting method, therefore, can be carried out under the control of chronometric instruments; to attain a degree of perfection and uniformity in the roasted coffee which is not attainable by any method now in use.

Inasmuch as the total quantity of heat, produced by chemical reactions in the beans, will be less than the quantity of heat required to evaporate the water of condensation on the surfaces of the beans, the exothermic heat of reaction will be expended through transformation into latent heat of evaporation, and will not effect a rise of temperature in the beans. This leaves only the kinetic energy of superheat in the steam to cause a rise of temperature in the beans above 212° F., and, since the time interval of steam passage through the beans is the governing factor, an exact degree of roast can be produced by termination of the process at a predetermined moment.

The temperature of the coffee beans can, therefore, be raised to any desired degree by maintaining a constant degree of superheat in the steam and controlling the quantity of steam passed through the moving mass of coffee during a given time interval. When the full time interval required, under the established correlated conditions, for maturity of the chemical reactions has expired, the coffee can be discharged.

The series of steps described results in the production of roasted coffee in which the highest possible quantity of soluble compounds, friability and porosity are developed.

For the purpose of practicing my process I provide a source of steam, the pressure of which is stabilized and controlled within 1% variation. My experiments have been performed at about 10 pounds pressure, although any other pressure may be used, provided that it is sufficiently high and stable to actuate flow through the equipment and coffee bed at a uniform rate.

I provide a superheater for steam having sufficient capacity to meet the requirements of the operation. A valved steam pipe leads from the source of steam into the super heater. A transverse partition is placed in the steam pipe and an appropriately sized orifice is formed through the partition. During the roasting operation the valve in the steam pipe stands entirely open, so that the entire pressure of the source of steam can be expressed at the orifice. By this arrangement steam will flow into and through the super heater at a rate of uniformity within one quarter of one percent variation, since the quantity of steam, flowing through an orifice, does not vary in direct proportion to the variation of its actuating pressure, but on a greatly reduced ratio. In fact, it can be consistently accepted, in the present case, that, for all practical purposes, the same exact number of cubic feet of steam will flow through the orifice during every minute of time. By this arrangement the quantity of steam flowing through the superheater is practically reduced to absolute uniformity, the measuring orifice and the pressure having been adjusted to deliver the correct quantity of steam required for the quantity of coffee being roasted.

The superheating apparatus is controlled by adjustable automatic instruments in such manner that the quantity of steam continuously passing through it will leave the superheater at a temperature uniformly stable within less than 1%. For all practical purposes this condition can be accepted as absolute uniformity of temperature. The temperature which experience has indicated as being best adapted to the heat treatment of food products, is about twice the maximum temperature reached by the product itself during heat treatment. Accordingly, since coffee, roasted for American consumption, will reach the complete development of essential compounds at about 340° F., I have doubled this figure to arrive at 680° F.; and for the purpose of hastening the operation for reasons above explained, I have added a factor of 10% to arrive at 748° F. as the approximately correct temperature of steam used as a vehicle for transferring heat into coffee.

The instrumental equipment of the superheater, being adjusted to function at 748° F., will insure that every cubic foot of steam leaving the superheater will register that temperature.

It is now to be observed, that we have a uniform exact number of cubic feet of steam, each at exactly the same uniform temperature, leaving the superheater during every minute, for the purpose of conveying heat into the coffee. It is conclusive that in each cubic foot of such steam there will reside the same exact number of B. t. u. available for infusion into the coffee, through which it is now to be passed. It is also conclusive that, under these conditions, a given mass of coffee will uniformly receive a given number of B. t. u. during every minute of steam passage through it. Accordingly, by maintaining a given mass of coffee in a state of movement, which rapidly intercommingles its constituent beans, every bean can be uniformly flooded with an abundant quantity of heat at that temperature which is most favorable to complete development of its flavor and aroma, while at the same time not sufficiently high to cause wastage or deterioration of the essential compounds forming in the coffee during the roasting process.

Under the condition just described, all that remains to be done, to produce perfectly roasted coffee, is to limit the number of minutes and seconds during which intercommingling of the steam with the coffee proceeds.

One other phase of the operation remains to be described, namely, to handle or manipulate the mass of coffee in such manner as to provide the opportunity for each bean of the mass to acquire the same temperature as all others during the roasting interval. This may be accomplished by a variety of means, two of which are hereinafter described as being representative of adaptable equipment for carrying my invention into practical and effective use. In one instance I provide a cylinder, constructed of perforated plate or screen and fitted with a series of internal partitions, comprising a continuous helicoid which extends progressively from one end to the other of the cylinder. Let it be assumed that such a cylinder is 32 feet in length and 4 feet in diameter, and that the spaces between the helical partitions are each one foot. The cylinder is rotatably mounted, in a horizontal position, inside a second cylinder of greater dimensions, which is steam tight, except for communicating conduits, through which to distributively admit and exhaust, respectively, steam to and from the outer cylinder. The outer cylinder is stationary and is thoroughly insulated against loss of heat from within.

An equipment, such as here described, will have a capacity for roasting coffee by my process of approximately 6000 pounds per hour. (The process is practical in capacities ranging from a few hundred pounds up to ten thousand pounds per hour.)

A means is provided for feeding green coffee continuously, at an exact uniform rate into one one of the perforated cylinder while it is being rotated. The feeding means is adjustable; and when once adjusted to a given quantity per hour no variation in the rate of feed can ever occur without resetting of the adjustment, but feeding may be started or discontinued at will.

Coffee fed into one end of the cylinder, will be progressively advanced by the helicoid toward the other end at the rate of one foot for each revolution of the cylinder; and will be discharged from the cylinder exactly 32 revolutions after entering, and at all times during this advance it will be maintained in a state of rapid intercommingling of its constituent beans. The exact conditions are as follows: Let it be assumed that the feeding device is adjusted to progressively admit 6000 pounds of coffee per hour to the cylinder, and that the roasting time is 4 minutes. Since there are 32 turns of the helicoid in the cylinder, a speed of 8 revolutions per minute will result in discharging coffee from the cylinder exactly 4 minutes after being fed into it. Likewise if 6000 pounds of coffee passes through the cylinder in exactly 60 minutes, then, 1/15 of 6000 pounds, which is 400 pounds, will pass through in 4 minutes. Therefore the cylinder will contain at all times 400 pounds of coffee, uniformly entrained from end to end; and, since the entrained 400 pounds in the cylinder are equally distributed in 32 equal spaces between the partitions, there will be 12½ pounds of coffee between each two partitions of the helicoid. The space between the helicoids is 12 inches and the cylinder is 4 feet in diameter. This means that each 12½ pounds of coffee will be spread over an area 12 inches wide by about 18 inches long. When the cylinder is in rotary movement, the 12½ pound masses of coffee do not rest on the bottom of the cylinder but occupy a position on its rising side, about midway between its vertical and horizontal diameters, with its surface inclined vertically from the angle of repose, which in the case of coffee is about 45 degrees.

The inner surface of the perforated cylinder is so treated as to prevent slippage of the mass of coffee. Accordingly, as the upper edge of the mass is continuously raised above the angle of repose, it continuously breaks and flows to the bottom of the mass. This intercommingling flow is as uniformly continuous as the rotation of the cylinder. The circumference of the cylinder is 12½ feet, and 32 revolutions are made during the transit of the coffee through the cylinder in 4 minutes. Therefore the distance through which the coffee flows, on the inner circumference of the cylinder, during the 4 minutes roasting interval, is 400 feet. If each 12½ pound mass of coffee covers 18 inches of the inner circumference of the cylinder, then its constituent beans will undergo eight complete intercommingling overturns for each revolution of the cylinder. The cylinder rotates at eight revolutions per minute. This means sixty-four intercommingling overturns of the coffee mass per minute or more than one such overturn per second.

In the annular space between the stationary outer cylinder and the rotating inner cylinder, baffle plates are arranged, whereby the heat laden steam is directed through the intercommingling masses of coffee, thereby enveloping the beans in its heat infusing embrace.

Inasmuch as the quantity of steam entering the roaster is uniformly measured, at constant rate, and each cubic foot of the steam contains the same number of B. t. u., and each 12½ pounds of loosely flowing coffee presents the same resistance to the flow of steam therethrough, each coffee bean will rise to the same temperature during its transit through the roaster.

A variable speed drive is used for rotating the cylinder, and since the speed of rotation of the cylinder determines the time interval of the roasting operation, this time interval can be made to coincide exactly with the temperature point of maximum development of quality in the coffee by accelerating or retarding the rotary speed of the cylinder. When the correct speed for a given blend of coffee is once found, the roasting of that blend will be continuously completed at that speed; and that speed can always be reestablished by setting the dial needle of the variable speed drive on the same dial index. Accordingly, the operator of the roaster can easily develop a dial formula for each of the various blends of coffee roasted in the plant.

This opportunity for scientific accuracy in large scale production is made possible only because of the constant set of heating conditions maintained in the path of the coffee through the cylinder, and the constancy of the set of heating conditions in the cylinder is made possible only by the control of steam flow and superheat earlier described.

In this process of roasting by the equipment above described, the roasting coffee is continuously and automatically discharged from the roasting cylinder at the exact stage of its maximum development. It must now be immediately cooled. To accomplish this, I provide means whereby the coffee leaving the cylinder will, within a fraction of one second, enter an air current, wherein its temperature is reduced to below 100° F. in less than 60 seconds.

If the temperature of the coffee leaving the roaster is 340° F., then the first 20° drop in temperature will bring it into a temperature range below that required for chemical reaction among its constituents. This first 20° reduction in temperature occurs almost instantaneously, because of the high differential between the temperature of the coffee and that of the enveloping cooling air. The essential compounds of the coffee are therefore fixed and preserved at their maximum stage of development.

The process of heat treatment herein described is also highly adaptable for roasting cacao beans, peanuts, popcorn, beans, nuts, corn, wheat and other materials of which an amassed quantity can be intercommingled without producing attrition of its constituent particles.

In the roasting of cacao beans, shelled peanuts, etc., the beans or nuts are fed into the roasting cylinder in the same manner as is coffee, or in any other way that will insure precisely uniform feed, and the degree of superheat, the quantity of steam and the time are coadjusted to produce the desired degree of roast.

In the case of cacao beans a special advantage is derived from the deposit of dew of condensation on the hulls before their temperature has reached 212° F. The moistening of the hull causes it to expand and releases its attachment to the kernel and the expansion and release of attachment is fully completed if, at the end of the heat treatment, the beans are subjected to inflation in some degree of vacuum. Thus, mass removal of the hulls without breaking of the kernels becomes practical and results in greater economy, because by removing the hulls from unfractured kernels, no fine particles of kernel can be lost in winnowing out of the hulls. At present, it is the universal practice throughout the chocolate industry to break, or crush, roasted cacao beans in order to release the hulls from the kernels, which practice results in a loss of from 2 to 7½% of the kernels in the subsequent winnowing out of the hulls.

In the case of peanuts roasted by my new process, the flow of the superheated steam through the moving, intercommingling mass washes the surfaces of the peanuts clean of all dust and other foreign matter; and if, at the end of the heat treatment, the peanuts are subjected to reduced pressure while still hot (hot peanuts are pliable, soft and tough), they are caused to expand, greatly enhancing their appearance, while cooling in the vacuum in expanded condition increases the tenderness and crispness of the peanuts because under vacuum all moisture is withdrawn.

Peanuts and other similar material, when roasted by the presently described process, do not undergo contraction sufficient to rupture their cell structure; consequently oil is not expressed therefrom to their surfaces. Inasmuch as rancidity of such material is the result of oxidation of oils so expressed, rancidity as a result of oxidation after roasting does not occur in the product of my roasting method. Another advantage of roasting peanuts and the like in accordance with the present invention is that the red skins which envelope the nuts are completely released from the kernels during the roasting process and can thereafter be easily removed without attrition to the surfaces of the kernels. This results not only in economy but in enhancing the appearance of the finished product—cleanliness thereof being conspicuous. What is here said of peanuts is also true of other similar products.

One preferred form of apparatus for carrying the present process into operation is set forth in the following detailed description and illustratively exemplified in the accompanying drawings, in which:

Fig. 1 is a substantially longitudinal sectional view through a steam roasting device according to the present invention the view being taken on line 1—1 of Fig. 2, some of the parts being shown in elevation; and Fig. 2 is a substantially transverse sectional view taken on line 2—2 of Fig. 1;

Figs. 3 and 4 are longitudinal sectional and substantially transverse sectional views, respectively, of the governor.

Referring to the drawings and particularly to Figure 2, A denotes the steam generator having the usual steam pressure gauge A' and steam dome $A^2$. Leading from the steam dome $A^2$ is a steam conduit $a$ provided with a valve $a'$ and governor $a^2$, the conduit $a$ leading to a superheater B. A conduit $b$ connects the superheater B with the roasting unit C. A suitable temperature controlling means $c$, in the roasting unit C is connected electrically to fuel control means in supply line of the burner D of a heat generating unit E. The steam generating unit A is fired by a liquid fuel burner G, the operation of which is governed by control means in the fuel supply line of the burner G, said control means being electrically connected to a temperature controlling means H in the conduit $a$ leading from the dome $A^2$.

Referring to the roasting unit C, 11 denotes an elongated cylindrical housing which is fixed in a supporting frame structure 12, 12a. The ends of the cylindrical housing 11 are closed by means of headers 13 and 14 which are secured to the cylindrical housing 11, the headers 13 and 14 being provided with manholes 13a, 14a, respectively. A steam vent 110 is provided in the periphery of cylinder 11 adjacent the header 14.

A perforated cylindrical drum 15 of a diameter considerably smaller than that of the cylindrical housing 11 is disposed eccentrically within and parallel to the latter and extends substantially from end to end thereof. The drum 15 adjacent opposite ends is provided with external annular flanges 16, 17, each of said flanges forming a track cooperating with pairs of trunnion rollers 18 cradled in bearings 19 and rotatably supporting the drum 15. Helical conveyor flights 20, having an outer diameter equal to the inner diameter of the drum 15, are fixed rigidly in and extend through the length of said drum. The inner periphery of the helix 20 defines an axial passageway 21 through the drum 15.

The receiving end of the drum 15 is provided with a closure plate 22 having a central cut-out 23. A feed pipe 24 leads from an overhead hopper 25 of the supply bin 26, through the circumferential wall of the cylindrical housing 11 and the cut-out 23 into an adjustable collar 27 within the drum 15, so as to feed the material to be roasted to the conveyor screw 20. A slide gate valve 28 in the upper part of the feed pipe 24 serves to close or open the feed pipe 24. Vertical adjustment of the collar 27 serves to regulate the feeding of material to be roasted into the drum 15.

At the delivery end of the drum 15, there is provided an end plate 29 with a discharge opening 30 through which the roasted material is discharged into a funnel shaped throat 31 of a chute 32 which passes downwardly through the peripheral wall of cylindrical housing 11.

A union 33 is mounted on the end plate 29 and projects axially and outwardly thereof. A drive shaft 34 extends through a stuffing box 35 mounted in the header 14, the inner end of the shaft 34 being keyed to the union 33, while its outer end is supported in a bearing 36 and carries a sprocket wheel 37 which is connected by means of a chain 38 to a second sprocket wheel 39 of a speed reducing unit operated by a motor 40.

A steam inlet conduit 41 and a steam outlet conduit 42 pass through the header 13 and project into the cylindrical housing 11 parallel to and outside of the perforated drum 15 to a transverse plane short of the inner edge of 16. The conduits 41 and 42 are closed at their inner ends and project into separate compartments 41a and 42a, respectively. The compartments 41a and 42a are formed by the circumferential walls of the cylindrical housing 11 and drum 15, two radial baffles 43 and 44 and two transverse substantially annular baffle members 45 and 46 cooperating, respectively, with the flanges 16 and 17 of the drum 15.

The present device is particularly adaptable for use in roasting coffee and operates as follows: When the perforated drum 15 carrying the conveyor 20 is continuously rotated by the motor 40 at a predetermined speed and in the direction of the arrow in Fig. 2, coffee will be fed by gravity at a rate predetermined by the vertical position of the adjustable collar 27 into the receiving end of the drum 15 and conveyor 20 when the gate 28 is open. The continuous mass of coffee beans feeding to the conveyor 20 moves longitudinally through the drum 15 and assumes in said drum an angle of repose indicated by line A—A in Fig. 2, which line extends between the inner edges of the two radial baffle plates 43 and 44. Superheated steam at a predetermined degree of superheat above its dew point is continuously supplied to the cylindrical housing 11 at a predetermined rate through the steam inlet conduit 41. The superheated steam fills the compartment 41a throughout the length of the drum 15 and then enters the latter through the perforated peripheral wall thereof and passes transversely across the drum 15 toward the space defined by line A—A where it is directed through the mass of moving coffee beans into the compartment 42a, from which it is exhausted through the exhaust pipe 42.

The heat treated coffee is discharged at the delivery end of drum 15 into the chute 32, from which it flows to the cooler F. The cooling unit F comprises a continuous woven wire conveyor 47 supported at opposite ends on pulleys 48 and 49. The material enters the cooling unit F by falling into an opening 50 formed by upstanding front and side walls and a triangular shaped baffle wall 51 having its base anchored in the side walls and its tip in the center of the conveyor 47. The under side of the baffle wall 51 is spaced above the band to allow the material to pass thereunder.

The side walls 52 of the unit are disposed above the band 47 and their opposite upper edges support a plurality of spaced bridge bars 53. Depending from the bars 53 are spaced triangular baffles 54 each thereof being a piece of angle material projecting to an elevation slightly above the upper lead of the band 47 and being disposed with their angles pointed in the direction of the opening 50 and opposite to the direction of movement of the upper lead of the band. The bottom wall 55 of the cooling unit is V-shaped and the end walls are semi-cylindrical and project about the pulleys 48 and 49. The material falling upon the band 47 is prevented from being crowded over the forward pulley 48 by an inclined plate 56 projecting between the side walls in advance of the baffle 51. As the material falls from the band 47 turning about its end pulley 49, it enters a chute 57 formed by the curved end wall and a depending wall 58 running from the lower peripheral surface of the band passing about the pulley 49. The bottom wall 55 joins the wall 58 about midway of its height. The conveyor is driven by a separate motor or other means not shown. An air exhaust outlet 59 is disposed in the side wall and connected through a pipe 60 with an exhaust fan unit 61, whereby air is drawn through the material on the band 47 through the latter and into the chamber in the cooling unit and thence through the outlet 59 to the exhaust unit 61.

Having now described the present invention and the manner in which the same operates, what I claim and desire to secure by Letters Patent is:

1. A continuous process of roasting vegetable material such as coffee, nuts, beans and grains, which consists in continuously moving a stream of the material to be roasted at a uniform predetermined rate through a predetermined path in a manner to continuously intercommingle the constituents of said material, continuously feeding superheated steam at a uniform rate into said moving stream and continuously separating said material from said steam at the end of said path.

2. A continuous process of roasting vegetable material such as coffee, nuts, beans and grains, which consists in continuously moving a stream of the material to be roasted at a uniform predetermined rate through a predetermined path in a manner to continuously intercommingle the constituents of said material, continuously feeding superheated steam at a uniform rate into said moving stream and subjecting the material which has traversed said path to a reduced pressure.

3. A method of roasting vegetable material such as coffee, nuts, beans and grains to a predetermined degree, which method consists in maintaining a predetermined quantity of the material to be roasted for a predetermined time interval in a state of movement whereby its constituents are continuously intercommingled and throughout said time interval causing a predetermined quantity of superheated steam, maintained at a predetermined initial temperature, to progressively intercommingle with the constituents of said material at a uniform rate.

4. A method of roasting vegetable material such as coffee, nuts, beans and grains to a predetermined degree, which method consists in maintaining a predetermined quantity of the material to be roasted for a predetermined time interval in a state of movement whereby its constituents are continuously intercommingled and throughout said time interval causing a predetermined quantity of superheated steam, maintained at a predetermined initial temperature, to progressively intercommingle with the constituents of said material at a uniform rate and at the end of said time interval subjecting said material to rapid withdrawal of heat therefrom.

5. The method of roasting vegetable material such as coffee, nuts, beans and grains, which consists in establishing and maintaining a supply of gas under a uniform pressure, releasing gas from said supply at a uniform rate, infusing heat into said released gas to raise its temperature to a final uniform degree and causing said gas to intercommingle with the constituents of a measured mass of said material to be roasted while the latter is maintained in a state of intercommingling movement of its constituents.

6. The process of roasting vegetable material such as coffee, nuts, beans and grains, which consists in continuously feeding said material into a state of continuously maintained movement whereby its constituents are continuously intercommingled and causing gas heated to a predetermined degree to continuously flow through said intercommingling mass of material at a uniform rate.

7. The process of roasting vegetable material such as coffee, nuts, beans and grains, to a predetermined degree which consists in maintaining measured quantities of such material in a state of movement whereby its constituents are continuously intercommingled, continuously releasing gas at a uniform rate from a source thereof under pressure, continuously infusing heat into said released gas to establish therein a uniform final temperature and causing said heated gas to flow through said intercommingling mass of material at a uniform rate during a predetermined time interval.

8. The method of infusing a definite quantity of heat into a definite quantity of granular material which consists in establishing and maintaining a source of gas under pressure, releasing gas from said source at a uniform rate, infusing heat into said released gas to establish therein a uniform final temperature in excess of that to which said granular material is to be heated, maintaining a definite quantity of said granular material in a state of movement whereby its granules are continuously intercommingled and simultaneously causing said heated gas to flow therethrough at a uniform rate during a predetermined time interval.

9. The method of roasting vegetable material such as coffee, nuts, beans and grains which consists in moving a mass of the material to be roasted in a manner to cause intercommingling of its constituents and causing superheated steam of a predetermined initial temperature and quantity to flow continuously through the moving mass at a predetermined rate during a predetermined time interval, and then automatically terminating the roasting process at the end of said time interval.

THOMAS J. STEPHENS.